United States Patent [19]

Wivinis

[11] Patent Number: 4,520,564
[45] Date of Patent: Jun. 4, 1985

[54] TOOL FOR REMOVING AUTOMOTIVE DOOR PANELS

[76] Inventor: Gerald P. Wivinis, 25889 Grass Lake Rd. W., Antioch, Ill. 60002

[21] Appl. No.: 548,922

[22] Filed: Nov. 7, 1983

[51] Int. Cl.³ .............................................. B26B 3/00
[52] U.S. Cl. ........................................ 30/168; 7/100; 30/167
[58] Field of Search ................ 30/168, 169, 358, 362; 145/24, 25, 26, 27; 7/100; 76/28

[56] References Cited

U.S. PATENT DOCUMENTS

| 1,980,737 | 11/1934 | Wolf | 145/20 |
| 2,232,409 | 2/1941 | Salzsieder | 145/24 |
| 2,505,860 | 5/1950 | Jockisch | 30/168 |
| 3,056,202 | 10/1962 | Chandler | 30/168 X |
| 3,398,613 | 8/1968 | Gallotti | 30/168 X |

Primary Examiner—E. R. Kazenske
Assistant Examiner—Willmon Fridie, Jr.
Attorney, Agent, or Firm—Robert E. Knechtel

[57] ABSTRACT

A tool for removing the outer sheet metal skin of an automobile door. The tool includes a head having a handle and a shank affixed to it, so that the tool can be held and guided by the handle, when operated with a pneumatic hammer or air chisel is coupled to the shank. The tool has a stepped groove formed in the bottom wall of the head, and a removable cutting bit which extends through the head and has its cutting edge coplanar with the bottom of the groove. Forward of the cutting bit the groove is of a deeper depth, and controls the depth of cut made by the tool when the cut edge of the sheet metal skin is seated in the groove behind the cutting bit. A bore also is provided in the head for dispelling the chip or scrape cut from the sheet metal skin.

10 Claims, 6 Drawing Figures

U.S. Patent  Jun. 4, 1985  Sheet 1 of 2  4,520,564
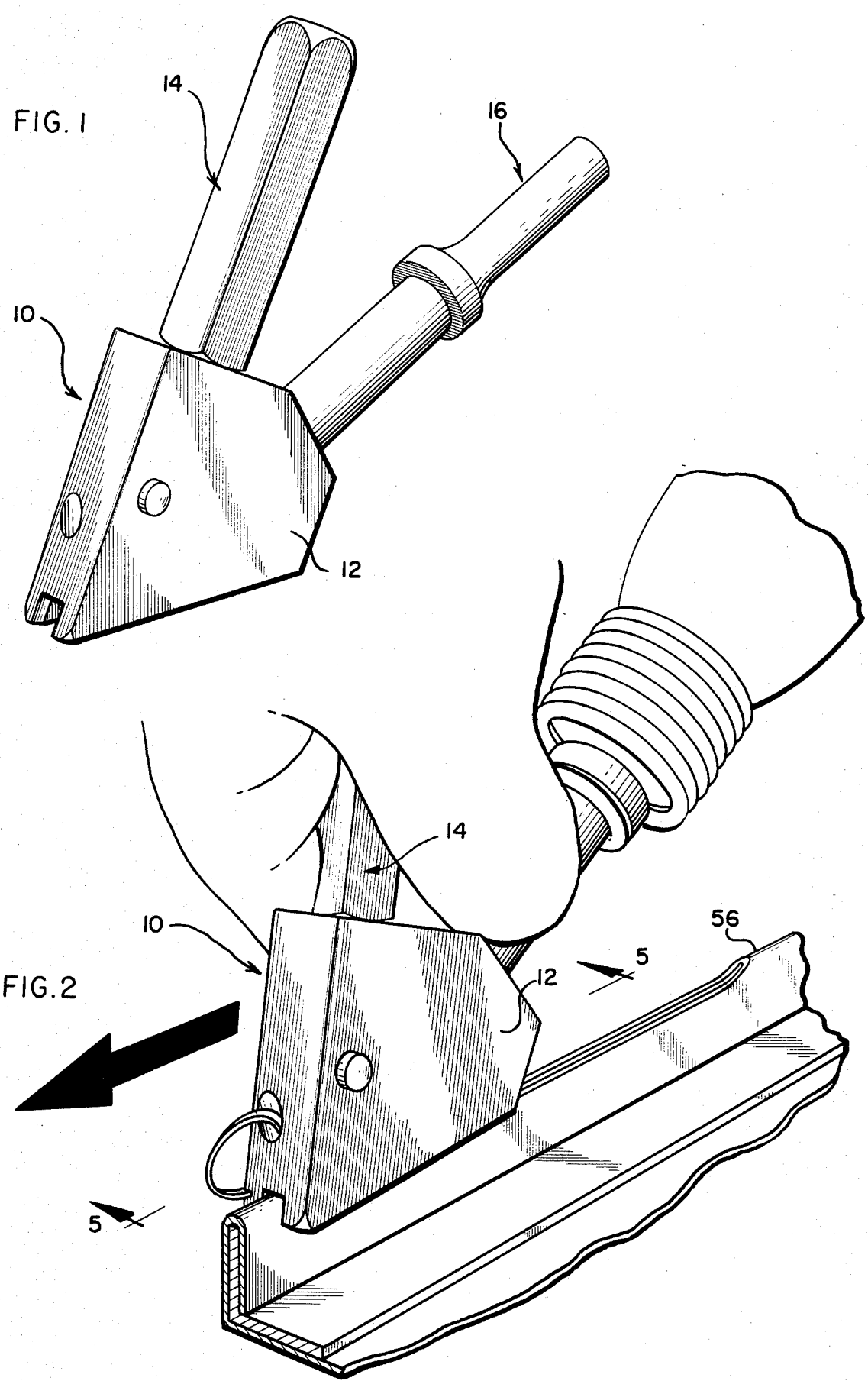

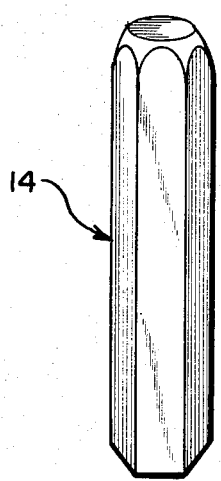
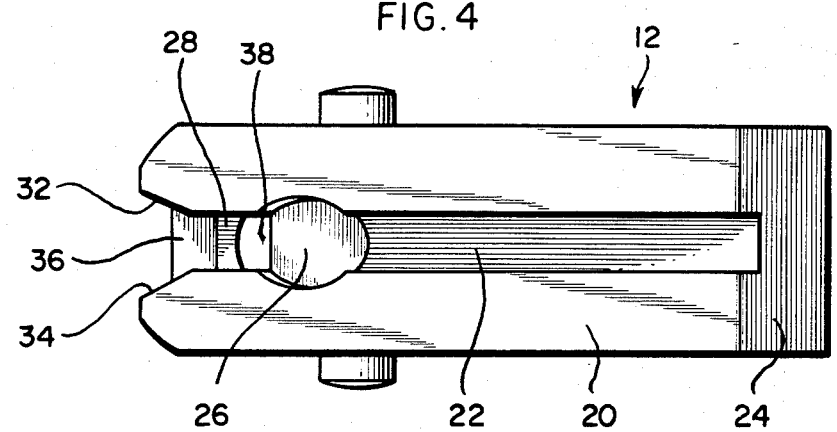
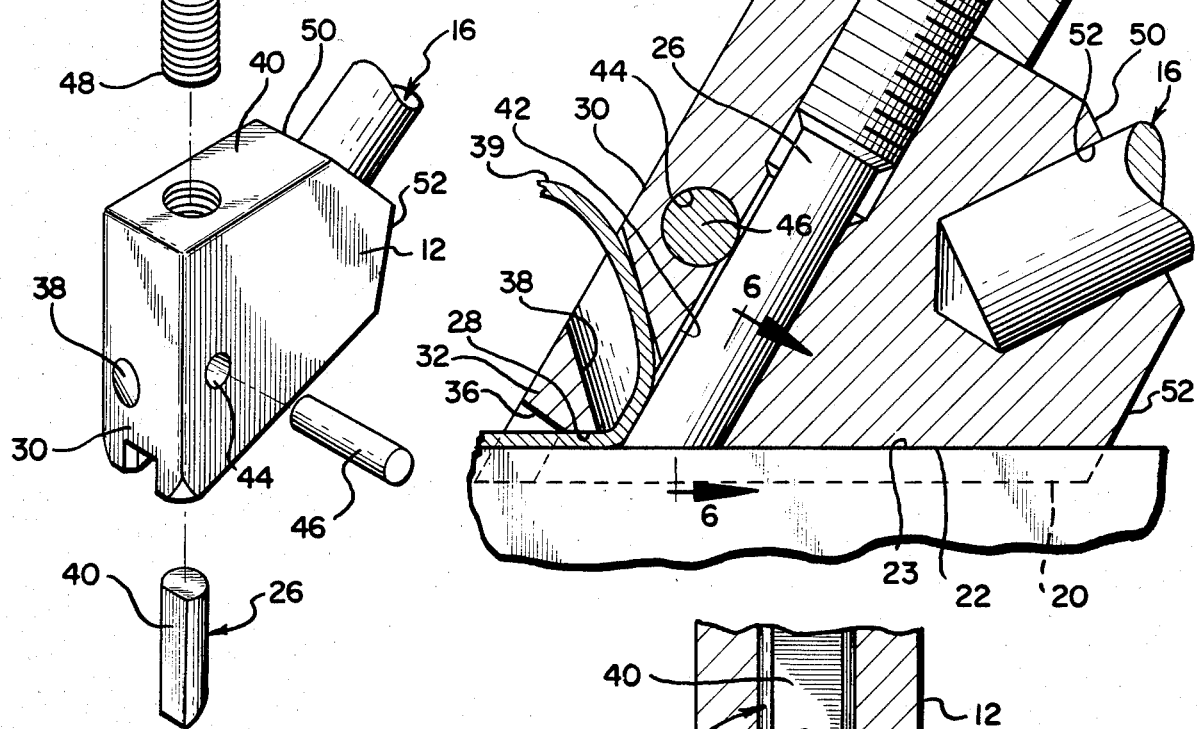
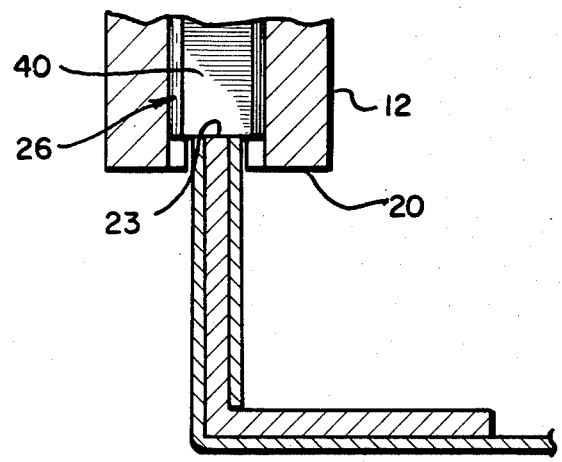

TOOL FOR REMOVING AUTOMOTIVE DOOR PANELS

BACKGROUND OF THE INVENTION

This invention relates to a tool for removing the door panel of an automobile door, i.e., the outer sheet metal skin of an automobile door.

An automobile door generally is comprised of a door frame having an outer sheet metal panel or skin affixed to it. The edges of the outer sheet metal are reversely folded around the door frame, with the door frame sandwiched between the sheet metal skin and the folded edges. The folded edges normally are spot welded to securely affix the sheet metal skin to the door frame.

In many cases when the doors are damaged, the door panels are simply removed and replaced to repair the door. In the past, this has generally been accomplished by grinding the edge of the sheet metal skin where it is reversely folded about the door frame. Doing so, however, is a laborious task and, in many cases, the door frame is damaged in the process. Various tools have been designed to perform this task, however, none of these tools are found to be entirely satisfactory, for one reason or another.

Accordingly, it is an object of the present invention to provide an improved tool for use in removing the outer sheet metal skin of an automobile door.

More particularly, it is an object to provide such a tool which can be used with a conventional pneumatic hammer, to rapidly remove the sheet metal skin without damaging the door frame to which it is affixed.

A still further object is to provide such a tool having a removable cutting bit, whereby the cutting bit can be easily replaced or sharpened.

BRIEF DESCRIPTION OF THE DRAWINGS

FIG. 1 is a perspective view of a tool exemplary of the invention;

FIG. 2 is a perspective view generally illustrating the manner in which the tool is used;

FIG. 3 is an exploded perspective view of the tool;

FIG. 4 is a bottom plan view of the tool;

FIG. 5 is a sectional view taken along lines 5—5 of FIG. 2; and

FIG. 6 is a sectional view taken along lines 6—6 of FIG. 5.

DESCRIPTION OF THE PREFERRED EMBODIMENT

Referring now to the drawings, there is illustrated a tool 10 which is of metal and includes a head 12, a handle 14 and a shank 16. The shank 16 is adapted to be connected with a conventional pneumatic hammer or air chisel 18, as illustrated in FIG. 2. The handle 14 is connected to the head 12, in a manner more fully described below, and is used to help guide the tool 10 during use.

The head 12 is a block of steel generally pentagonal in configuration and having a bottom wall 20, a front wall 30, a top wall 40 and a back wall formed by a pair of angled back walls 50 and 52. The bottom wall 20 has a guide groove 22 formed in it, which extends from the back wall 52 toward the front wall 30 to where it merges with a cutting bit 26. The guide groove 22 is of sufficient width to receive therebetween the reversely folded edge 56 of the outer sheet metal skin 58, as illustrated in FIG. 2. Forward of the cutting bit 26, the guide groove 22 is extended to and through the front wall 30 of the tool 10, but the depth of the groove is deeper, so that the bottom surface 28 of the guide groove is deeper than the bottom 23 of the guide groove 22.

The front wall 30, where the guide groove 22 extends through it, is provided with beveled edges 32, 34 and 36 to provide a scoop-like opening into the guide groove 22. A chip hole 38 also is formed in the front wall 30 and extends at a compound angle through the head 12 where it merges with a bore 42 and the guide groove 22. Preferably and advantageously, the chip hole 30 extends from the bottom of the tool 10 to the right, or left, at an angle of 15°, and upwardly from the bottom of the tool 10 at an angle of 20°. With the chip hole 38 at this angle, the chip 39 (i.e. scrape cut from the folded edge 56 of the outer sheet metal skin 58) is caused to roll or curl into a spiral approximately 1 inch in diameter and in a direction away from the user so that a sharply pointed chip is not directed at the user when using the tool.

A cutting bit bore 42 extends angularly through the head 12, from the bottom of the tool to and through the top wall 40. The cutting bit bore 42 is at an angle of 35°, however, it may range from 25° to 45°. The 35° angle, however, is found to be the most satisfactory for efficient operation of the tool 10 and for a longer cutting life before re-sharpening of the cutting bit 26 is required. The cutting bit bore 42 is proportioned to tightly and frictionally receive therein the cutting bit 26, and the upper end thereof near the top wall 40 is threaded and proportioned to threadedly receive therein a set screw 48. The set screw 48 functions in a dual capacity, to set the cutting bit 26 and to attach the handle 14 to the tool 10, all as more particularly described below.

A locking pin bore 44 extends through the head 12 and is positioned to intersect the cutting bit bore 42, such that a tapered or eccentric locking pin 46 when extended into the locking pin bore 44 frictionally engages and locks the cutting bit 26 in cutting position. The locking pin 44 engages against a flat 40 formed on the cutting bit 26. The cutting bit 26 preferably and advantageously is of a M2 steel for long life, however, other materials can be used. The lower or cutting edge of the cutting bit 26 is ground so that it extends parallel with the bottom surface 23 of the guide groove 22.

In setting up the tool 10 for use, the cutting bit 26 is extended into the cutting bit bore 42, and the set screw 48 is threaded into the cutting bit bore 42 to engage against the upper end of the cutting bit 26. A flat object is placed in the guide groove 22 along its bottom surface 23 and is extended over the bottom opening of the cutting bit bore 42. The set screw 48 then is threadedly adjusted to force the cutting bit 26 through the cutting bit bore 42 until it engages against the flat object placed in the guide groove 22. The lower or cutting edge of the cutting bit 26 thus is flush or co-planar with and effectively constitutes an extension of the bottom surface 23 of the guide groove 22. Next, the locking pin 46 is driven into the locking pin bore 44 to frictionally and lockingly engage the cutting bit 26 to lock it in cutting position. Next, the handle 14 is threaded onto the set screw 48 and, using a torque wrench, is tightened to 50–60 foot-lbs. pressure to securely lock it to the tool 10.

When starting a cut, the tool 10 is angularly held so that the cutting bit 26 cuts into the metal of the reversely folded edge 56 of the outer sheet metal skin 58. The edges of the guide groove 22 at the front of the tool 10 will function to guide the tool 10 during the initial cutting, and the bottom surface 28 of the guide groove 22 will control the depth of cut. When the length of the cut is sufficiently long, the cut edge is seated flat in the guide groove 22 along its bottom 23, as illustrated in FIGS. 2 and 5. The bottom surface 23 of the guide groove 22 (i.e., the depth of the guide groove 22) need only be of sufficient depth so that the edges of the guide groove 22 overlap the reversely folded edge 56 and provide a guide for the tool 10 as the edge 56 is being cut. In an operable embodiment, the depth of the guide groove 22 to its bottom surface 23 is 0.125 inches and this depth has been found to be entirely satisfactory to guide the tool 10 during cutting. With the cut edge seated flat in the guide grooves 22, the tool merely is progressively advanced to continue cutting the reversely folded edge 56.

The bottom surface 28 of the guide groove 22, with the cut edge seated flat on the bottom surface 23 of the guide groove 22, will control the depth of cut made by the tool 10. In the operable embodiment of the tool 10, the bottom surface 28 is 0.065 inches deeper in depth than the bottom surface 23 of the guide groove 22. The depth of cut therefore is limited to 0.065 inches from the top edge of the reversely folded edge 56, since the bottom surface 28 will ride on the top edge. A depth of cut of 0.065 inches is preferred, since this depth of cut is sufficiently deep to not only cut off the reversely folded edge 56 but also a short length of material below the edge.

As the reversely folded edge 56 is cut off, the scrap 39 feeds through the chip hole 38. As indicated above, the compound angle of the chip hole 38 causes the scrap 39 to curl or spiral in a radius of approximately 1 inch and in a direction away from the user. Obviously, during cutting, the fingers should be kept away from the chip hole 38.

When used properly, the cutting bit 26 will have an extended life. In any event, should the cutting bit 26 need sharpening, or replacement, this is easily accomplished simply by removing it, by reversing the procedure described above for properly positioning the cutting bit 26 in the cutting bit bore 42.

What is claimed is:

1. A tool for use in removing a door panel from an automobile door, the door panel being an outer sheet metal skin with its edges reversely folded over the edge of the door frame so that the door frame is sandwiched between the folded over edge and the outer sheet metal skin, said tool comprising:
   a head having at least a front wall, a back wall and a bottom wall;
   a stepped guide groove formed in said bottom wall and extending from said back wall to said front wall and having a first and a second bottom surface, said second bottom surface being deeper in depth than said first bottom surface;
   a cutting bit disposed with the cutting edge thereof co-planar with said first bottom surface of said guide groove, said second bottom surface of said guide groove being forward of said cutting bit.

2. The tool of claim 1, further comprising a cutting bit bore in said head, said cutting bit being removably secured within said cutting bore, whereby said cutting bit is removable fo sharpening or replacement.

3. The tool of claim 1, further comprising a chip hole in said head disposed to permit scrap material cut by said tool to exit through said chip hole.

4. The tool of claim 3, wherein said chip hole angularly extends through said head at a compound angle to cause said scrap material to coil in a radius and to exit at an angle directed away from a user of said tool.

5. The tool of claim 2, wherein said cutting bit is disposed at an angle within a range of 25° to 45° from said first bottom surface.

6. The tool of claim 5, wherein said cutting bit is disposed at an angle of 35% from said first bottom surface.

7. The tool of claim 1, wherein said second bottom surface is deeper in depth from said first bottom surface by 0.065 inches.

8. The tool of claim 1, further comprising a handle affixed to said head for assistance in guiding said tool during use, and a shank affixed to said head and adapted to be operatively received by pneumatic means to operate said tool.

9. The tool of claim 8, wherein said front wall about said guide groove is beveled to provide a scoop like opening into said guide groove.

10. The tool of claim 9, further comprising a locking pin bore in said head disposed to intersect said cutting bit bore, a locking pin removably disposed within said locking pin bore and frictionally engaging said cutting bit to lockingly secure said cutting bit in said cutting bit bore.

* * * * *